Patented Aug. 19, 1947

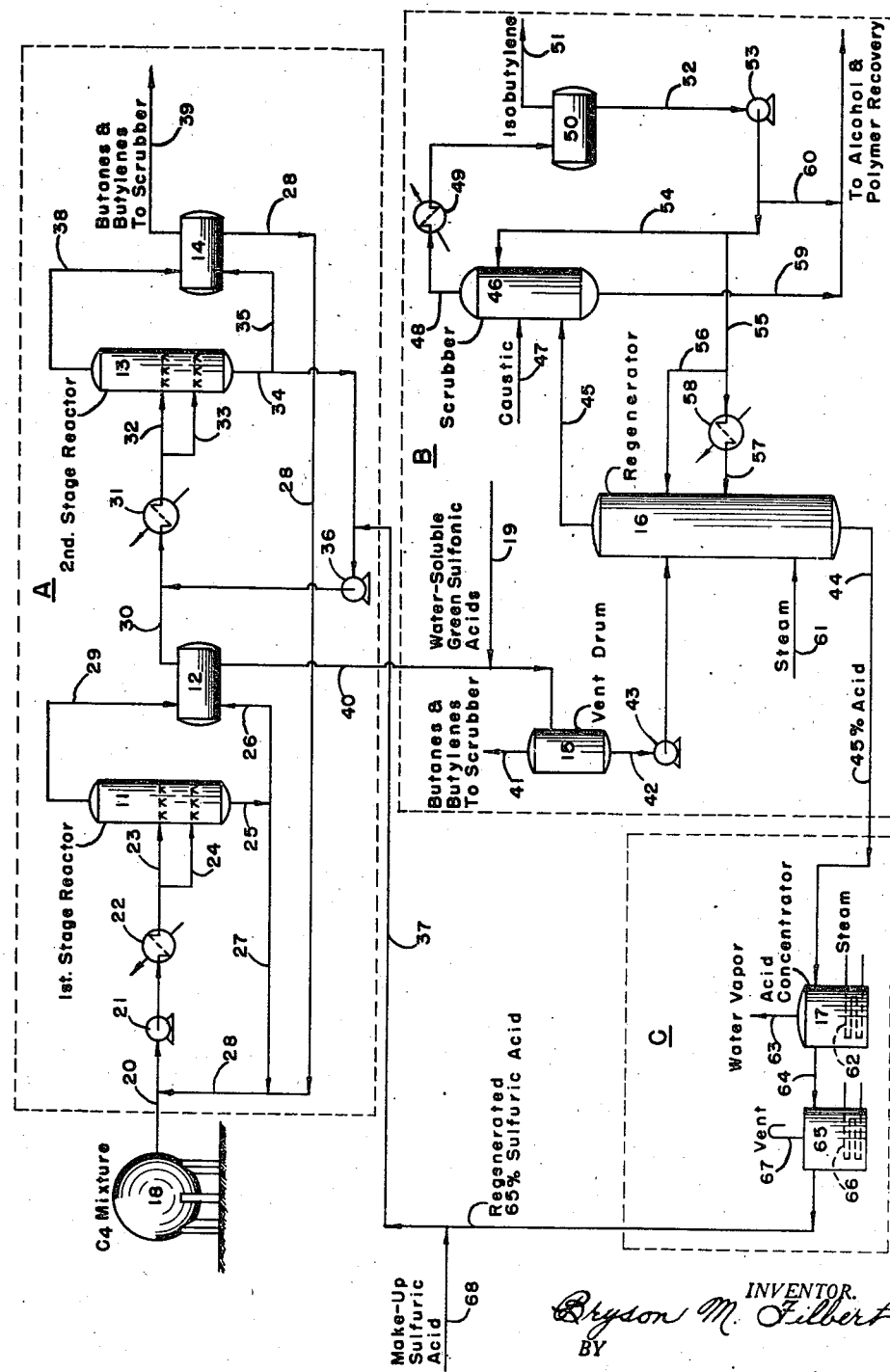

2,426,088

UNITED STATES PATENT OFFICE 2,426,088

METHOD FOR ELIMINATING FOAMING IN THE RECOVERY OF SULFURIC ACID FROM AN OLEFIN RECOVERY OPERATION

\_\_son M. Filbert, Wooster, Tex., assignor to Standard Oil Development Company, a corporation of Delaware Application June 4, 1945, Serial No. 597,405

6 Claims. (Cl. 260—677)

The present invention is directed to a method for concentrating relatively weak sulfuric acid which has been previously employed for treating hydrocarbons.

More particularly, the present invention is directed to a process comprising the treatment of a hydrocarbon feed stock including olefins with sulfuric acid to form an extract, the separation of the extract into an acid fraction and a hydrocarbon fraction and the concentration of the recovered acid wherein water-soluble green sulfonic acids are employed to prevent foaming of the extract during the separation step and the foaming of the sulfuric acid undergoing concentration.

It is conventional to the art to recover low molecular weight olefins from a hydrocarbon mixture by contacting the mixture with 65% sulfuric acid. As an example of a typical operation, a hydrocarbon feed stock including normal butane, isobutylene and normal butylene may be brought into contact with sulfuric acid in a reaction zone under a pressure substantially in excess of atmospheric in order to form an extract. The pressure on this extract is reduced to substantially atmospheric in a vent drum with the resultant release of the butanes and the butylenes previously dissolved therein. The extract is then sent to a regenerator whereby polymers, alcohols and olefins resulting from the reaction of the sulfuric acid with the hydrocarbon mixture are separated as overhead fractions and the acid is recovered at about 45% strength. The acid is removed from the regenerator to an acid concentrator where its strength is increased to 65% and then returned to the reaction zone of the system. In conventional operations, a substantial foaming is encountered in the vent drum, the regenerator and in the acid concentrator and this foaming reduces the capacity of these portions of the system.

In accordance with the present invention, foaming in the vent drum, regenerator and acid concentrator is eliminated by adding small amounts of water-soluble green sulfonic acids to the sulfuric acid extract being circulated in the system. The water-soluble green sulfonic acids are preferably added to the sulfuric acid-hydrocarbon extract or mixture as it is being passed from the reaction zone to the vent drum, but alternatively the water-soluble green sulfonic acids may be added to the stream of sulfuric acid flowing through other portions of the system.

The production of green water-soluble sulfonic acids is well known to the art. A conventional method for preparing these acids involves the treatment with concentrated sulfuric acid of a feed stock comprising a substantial portion of unsaturated cyclic-hydrocarbons; upon such a treatment a layer comprising oil and oil-soluble sulfonic acids or mahogany acids is obtained and a layer comprising sludge particles and water-soluble green sulfonic acids is obtained. These two layers are then separated under the influence of gravity and the mixture of green water-soluble sulfonic acids and sludgy materials is treated to obtain the desired green water-soluble sulfonic acid. As a specific example, a distillate obtained from a naphthenic crude oil may be solvent extracted with a selective solvent of the characteristics of phenol or furfural and the extract brought into contact with sulfuric acid of approximately 98% concentration. Upon contacting the concentrated sulfuric acid with the petroleum extract, sulfonic acids are formed. It is customary to divide the total volume of concentrated sulfuric acid into a number of portions and treat the petroleum extract separately with each portion with the resultant green sulfonic acids and sludge being withdrawn from the petroleum fraction after each treatment and before the addition of another portion of concentrated sulfuric acid.

In the practice of the present invention, the water-soluble green sulfonic acids may be added to the sulfuric acid or to sulfuric acid-hydrocarbon extract or mixture being circulated through the system in amounts within the range of 0.10 to 0.50 volume percent. Under normal operating conditions, a concentration of .025 volume percent of water-soluble green sulfonic acids in the sulfuric acid-hydrocarbon mixture or extract will be found to produce satisfactory results; under some circumstances a higher concentration of the water-soluble green sulfonic acids may be necessary in order to eliminate foaming while under other operating conditions a concentration of water-soluble green sulfonic acids of the order of .010 volume percent will be satisfactory.

The invention will now be described in greater detail in conjunction with the drawing in which the single figure is in the form of a flow sheet illustrating a preferred modification of the present invention.

The system shown in the drawing may be described generally as involving a reaction zone, an acid regenerating zone and an acid concentrating zone. These three zones are indicated in the drawing by dashed rectangles, the reaction zone being designated by the letter A, the acid regenerating zone by the letter B and the acid concentrating zone by the letter C.

The reaction zone A includes a first stage reactor 11, a first stage settling drum 12, a second stage reactor 13 and a second stage settling drum 14. The acid regenerating zone B includes vent drum 15 and regenerator 16. The acid concentrating zone C includes an acid concentrator shown as a single vessel 17 and an accumulator vessel 65. The feed hydrocarbons are passed to the system from storage vessel 18.

In the reaction or absorption zone A the feed hydrocarbons flow through the first and second stages in sequence and the sulfuric acid is passed into the second stage to form an extract therein, the extract taken from the second stage to the first stage where it is enriched and the resulting enriched extract is sent through the acid regeneration and acid concentration zones. The vent drum 15 is arranged between settling vessel 12 and regenerator 16 in order to allow the release of pressure of the extract before it is sent to the regenerator.

In order to prevent foaming of the acid in vent drum 15, regenerator 16 and acid concentrator 17, green sulfonic acids resulting from the treatment with strong sulfuric acid of an extract fraction obtained when contacting a selective solvent with a petroleum fraction comprising a substantial amount of cyclic-hydrocarbons is added to the circulating stream of acid. In the drawing the means for adding the green sulfonic acids is indicated as inlet 19.

The hydrocarbon feed stock is passed from vessel 18 by line 20 in which is arranged a pump 21 and heat exchanger 22 and discharges through distributing lines 23 and 24 into first stage reactor 11. The liquid from the bottom of reactor 11 is withdrawn through line 25 and the stream split, with a portion passing through line 26 to first stage settling zone 12 and the remainder recycled to line 20 via line 27. To the extract flowing through line 27 is added extract withdrawn through line 28 from the second stage settling zone 14. The extract withdrawn from drum 14 and the extract withdrawn from the first stage reactor 11 are mixed in line 27 and the mixture of extract is then discharged into the hydrocarbon stream in line 20. The hydrocarbons in reactor 11 which are not absorbed or do not react with sulfuric acid therein are removed as overhead through line 29 and discharged into the upper portion of settling drum 12. The unabsorbed hydrocarbons pass from settling drum 12 through line 30, containing heat exchanger 31, and are discharged through lines 32 and 33 in the second stage reactor 13. Extract from the lower portion of second stage reactor 13 is withdrawn through line 34 and the stream split, with a portion passing through line 35 to second stage settling zone 14 and the remainder passing through pump 36 and discharging into the hydrocarbon stream passing through line 30. The regenerated and reconcentrated sulfuric acid is added to the stream flowing in line 34 by line 37.

Unabsorbed and unreacted hydrocarbons from the second stage reactor 13 pass through line 38 to second stage settling vessel 14 and the unreacted and unabsorbed hydrocarbons from vessel 14 are withdrawn from outlet 39.

Settling drum 12 is operated under superatmospheric pressure and to recover hydrocarbons from the extract, it is desirable first to release the pressure from the extract to vent dissolved hydrocarbons and subsequently subject it to dilution and a heating operation to recover absorbed hydrocarbons. In the drawing, the extract from settling vessel 12 is withdrawn through line 40 to vent drum 15 where the pressure is released to atmospheric by vent line 41. Extract is withdrawn from drum 15 via line 42 containing pump 43 and discharged into regenerator tower 16. Hydrocarbons in vaporous condition are removed from tower 16 as overhead through outlet 45 and pass into scrubber 46 where they come into contact with caustic introduced into the scrubber through inlet 47. Vapors from scrubber 46 pass through outlet 48, cooler 49 and discharge into accumulator 50. Uncondensed constituents are removed in gaseous form from accumulator 50 through outlet 51 while condensate is removed through outlet 52 containing pump 53. After the condensate passes through pump 53, the stream is split; a portion passes through line 54 and is discharged as a scrubbing medium in scrubber 46, a second portion passes through line 55 and is again divided with one portion discharging through line 56 into regenerator 16 and the remaining portion passing through line 57 and heater 58 and being discharged into regenerator 16. A portion of the stream in line 52 is withdrawn through line 60 and mingled in line 59 with the bottoms withdrawn from scrubber 46. The mixture in line 59 includes alcohol and polymer and is withdrawn from the system to a suitable arrangement for recovering these materials.

The acid is withdrawn from the bottom of regenerator tower 16 through line 44 and passes to acid concentrator 17. In this vessel the acid is heated by steam passing through coil 62 and water vapor is driven from the acid and discharged through outlet 63. The acid from vessel 17 is discharged into an accumulator vessel 65 containing a cooling coil 66 and vent 67. From vessel 65 the regenerated acid is passed through lines 37 and 34 to the hydrocarbon stream in line 30. In order to replace acid lost in the operation, make-up acid may be added to the stream of regenerated acid through inlet line 68.

As an example illustrating the operation of the process in the drawing, the feed stock withdrawn from vessel 18 may consist of 50% iso and normal butane, 32% normal butylene and 18% isobutylene. The first stage reactor vessel may be operated at a temperature of 100° F. and a pressure of approximately 40 pounds per square inch while second stage reactor 13 may be operated at a temperature of 70° F. and under a pressure of 135 pounds per square inch. Under these conditions, the pressure in first settling zone 12 is approximately 135 pounds per square inch and the pressure on this material is released to atmospheric pressure as it is passed into vent drum 15. The regenerator tower 16 may be operated with a bottom temperature of 240° F. and a top temperature of 160° F. with acid of a concentration of approximately 45% withdrawn therefrom through line 44. The acid may be concentrated in unit 17 to a strength of approximately 65%.

Having fully described and illustrated the present invention, what I desire to claim is:

1. In the treatment of an extract under superatmospheric pressure resulting from the contact of sulfuric acid with low molecular weight olefins, the steps of incorporating water-soluble green sulfonic acids in the extract in an amount sufficient to eliminate foaming of said extract upon heating the extract under reduced pressure and subsequently heating the extract under a reduced pressure to recover olefins therefrom.

2. A method in accordance with claim 1 in which the water-soluble green sulfonic acids are added to the extract to produce a concentration of approximately .025 volume per cent of water-soluble green sulfonic acids therein.

3. In a method involving the steps of contacting a predominately C₄ hydrocarbon feed stock comprising olefins with sulfuric acid under superatmospheric pressure in a reaction zone to form an extract, removing the extract from the reaction zone to a regeneration zone, reducing the pressure imposed on the extract and heating it to cause vaporization of a major portion of the hydrocarbons from said extract and recovery of the sulfuric acid and the recycling of the recovered sulfuric acid to the reaction zone, the step of adding water-soluble green sulfonic acids to the circulating sulfuric acid stream in an amount sufficient substantially to eliminate foam in the regeneration zone.

4. A method in accordance with claim 3 in which approximately .025 volume percent of water-soluble green sulfonic acids are added to the extract passed to the regeneration zone.

5. In a method including the steps of contacting a hydrocarbon feed stock comprising a substantial portion of C₄ hydrocarbons and appreciable amounts of olefins with sulfuric acid under superatmospheric pressure in a reaction zone to form an extract, removing the extract to an acid regeneration zone and there separating it into a hydrocarbon fraction and an acid fraction of approximately the same concentration as the acid employed in the reaction zone, the step of adding water-soluble green sulfonic acids to th extract sent from the reaction zone to the regeneration zone in an amount sufficient to eliminate foaming in the regeneration zone.

6. A method in accordance with claim 5 in which approximately .025 volume percent of water-soluble green sulfonic acids are added to the extract being sent from the reaction zone to the regeneration zone.

BRYSON M. FILBERT.

REFERENCES CITED

The following references are of record in the file of this patent:

UNITED STATES PATENTS

| Number | Name | Date |
| --- | --- | --- |
| 2,304,280 | Read | Dec. 8, 1942 |
| 2,330,077 | O'Dell | Sept. 21, 1943 |
| 1,964,641 | Mathias | June 26, 1934 |
| 1,775,622 | Heckel et al. | Sept. 9, 1930 |
| 1,919,664 | Merrill et al. | July 25, 1933 |
| 1,474,933 | Humphreys et al. | Nov. 20, 1923 |